(12) United States Patent
Cheng et al.

(10) Patent No.: US 12,381,965 B2
(45) Date of Patent: Aug. 5, 2025

(54) HINGE

(71) Applicant: FOSITEK CORPORATION, New Taipei (TW)

(72) Inventors: Yan-Jiao Cheng, Shenzhen (CN); An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 587 days.

(21) Appl. No.: 17/950,950

(22) Filed: Sep. 22, 2022

(65) Prior Publication Data

US 2024/0056517 A1 Feb. 15, 2024

(30) Foreign Application Priority Data

Aug. 15, 2022 (CN) ............................ 202210972478

(51) Int. Cl.
*H04M 1/02* (2006.01)
*F16C 11/12* (2006.01)

(52) U.S. Cl.
CPC ........... *H04M 1/0216* (2013.01); *F16C 11/12* (2013.01)

(58) Field of Classification Search
CPC .. H04M 1/0216; H04M 1/0268; H04M 1/022; H04M 1/0218; H04M 1/02; F16C 11/12; F16C 11/04; F16C 11/103; H04R 1/04; H04R 1/2876; H04R 1/406; H04R 3/005; H04R 2499/11; G06F 1/16; G06F 1/1683; G06F 1/1684; G06F 1/1688

See application file for complete search history.

(56) References Cited

U.S. PATENT DOCUMENTS

2004/0137958 A1* 7/2004 Sawai ................. H04M 1/0218
455/566
2020/0409428 A1* 12/2020 Wang .................. H04M 1/0268

* cited by examiner

*Primary Examiner* — Fred A Casca
(74) *Attorney, Agent, or Firm* — Burris Law, PLLC

(57) ABSTRACT

A hinge includes two guide frames spaced apart from each other in a front-rear direction, a transmitting assembly interposed between the guide frames, a frictional torque generating assembly having two opposite thrust plates, and two rotary brackets disposed opposite to each other. Each rotary bracket includes an arcuate pivot portion pivotably connected with the respective guide frame, an actuating portion coupled with the transmitting assembly to actuate the transmitting assembly, and a frictional surface in frictional contact with the respective thrust plate to bring synchronous rotations of the arcuate pivot portion, the actuating portion and the frictional surface, and to make synchronous and opposite rotations of the rotary brackets.

15 Claims, 15 Drawing Sheets

HINGE

CROSS-REFERENCE TO RELATED APPLICATION

This application claims priority to Chinese Patent Application No. 202210972478.5, filed on Aug. 15, 2022.

FIELD

The disclosure relates to a hinge, and more particularly to a hinge with a synchronizing mechanism to make rotations of two device parts of a foldable electronic device synchronous.

BACKGROUND

A conventional foldable electronic device (for example, a mobile phone, a tablet, a laptop, an e-book, etc.) with a flexible display screen has two device parts pivotably connected with each other through a hinge to be shifted between folded and unfolded states. A conventional hinge includes a synchronizing mechanism and a frictional torque generating mechanism. The synchronizing mechanism includes two pairs of guide frames and two rotary brackets. Each rotary bracket is pivotably disposed between the guide frames of each pair and is connected with one device part so as to make synchronous rotations of the device parts. The frictional torque generating mechanism includes two shafts, two cams sleeved on the shafts, and two cam frames pivotably connected with the shafts and connected with the device parts so as to generate a frictional torque to retain the device parts at a predetermined angular position.

Another conventional hinge has a synchronizing mechanism and the frictional torque generating mechanism integrally formed with each other. Such hinges include two rotary brackets, two axle shafts, two cam frames pivotably connected with the axle shafts, a cam disposed on the axle shaft, and two slidably coupling mechanisms. Each slidably coupling mechanism is coupled with the respective rotary bracket, the respective cam frame and the corresponding device part.

However, the conventional hinges described above have a relatively large number of component parts and complicated structures, and are therefore costly and inconvenient to manufacture and assemble.

SUMMARY

Therefore, an object of the disclosure is to provide a hinge that can alleviate at least one of the drawbacks of the prior art.

According to the disclosure, the hinge includes two guide frames, a transmitting assembly, a frictional torque generating assembly and two rotary brackets. The guide frames are disposed opposite to and spaced apart from each other in a front-rear direction. The transmitting assembly is interposed between the guide frames. The frictional torque generating assembly includes two thrust plates which are disposed opposite to each other in the front-rear direction. The rotary brackets are disposed opposite to each other and along the front-rear direction. Each of the rotary brackets includes an arcuate pivot portion which is pivotably connected with a respective one of the guide frames, an actuating portion which is coupled with the transmitting assembly to actuate the transmitting assembly with pivoting rotation of the arcuate pivot portion relative to the respective guide frame, and a frictional surface which is in frictional contact with a respective one of the thrust plates. Each of the rotary brackets is disposed to bring synchronous rotations of the arcuate pivot portion, the actuating portion and the frictional surface relative to the respective guide frame, the transmitting assembly and the respective thrust plate. Each of the rotary brackets is disposed to, through the transmitting assembly, make synchronous rotations of the rotary brackets in opposite rotational directions.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
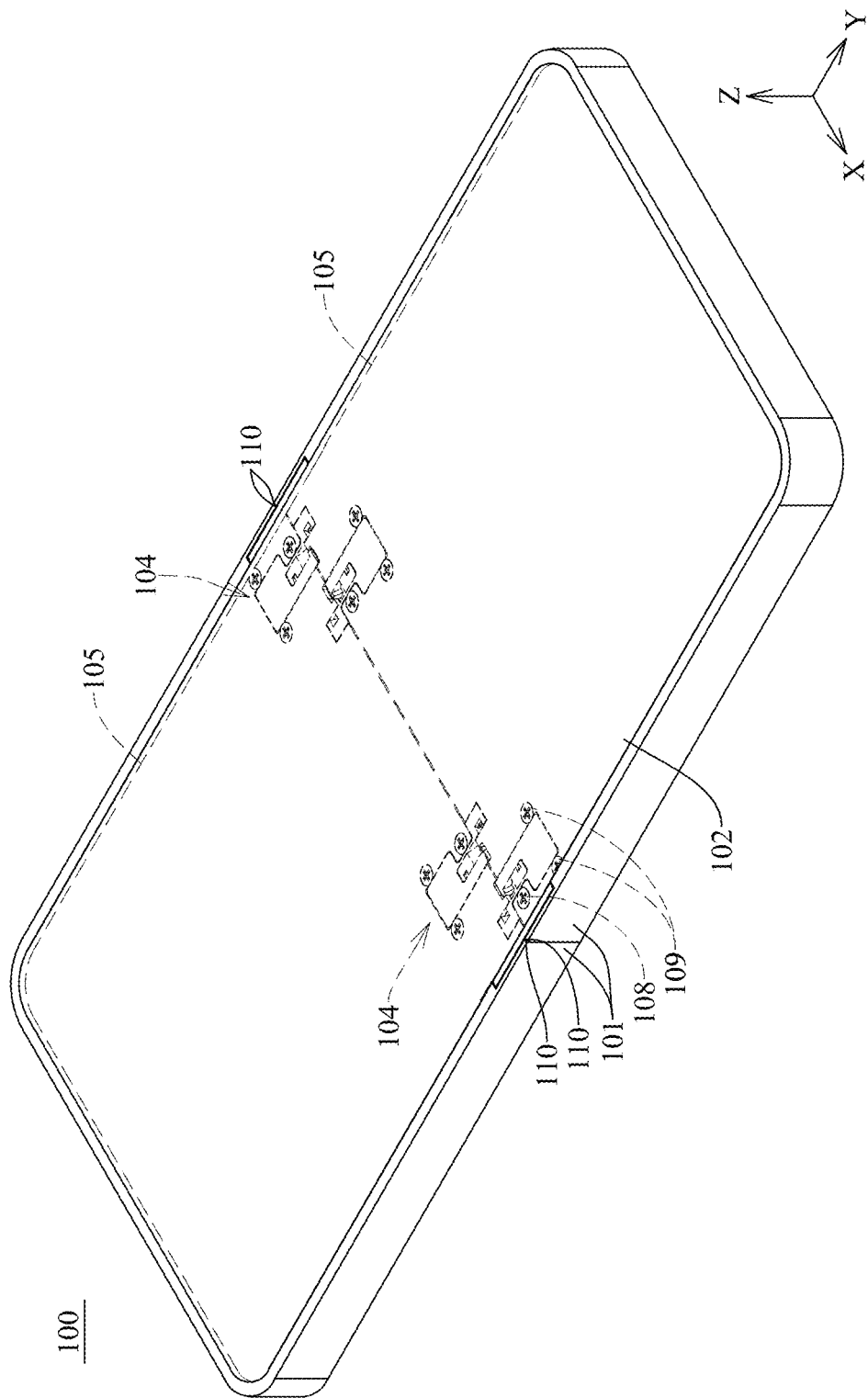
FIG. 1 is a perspective view illustrating an embodiment of a hinge according to the disclosure mounted between two device parts of a foldable electronic device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
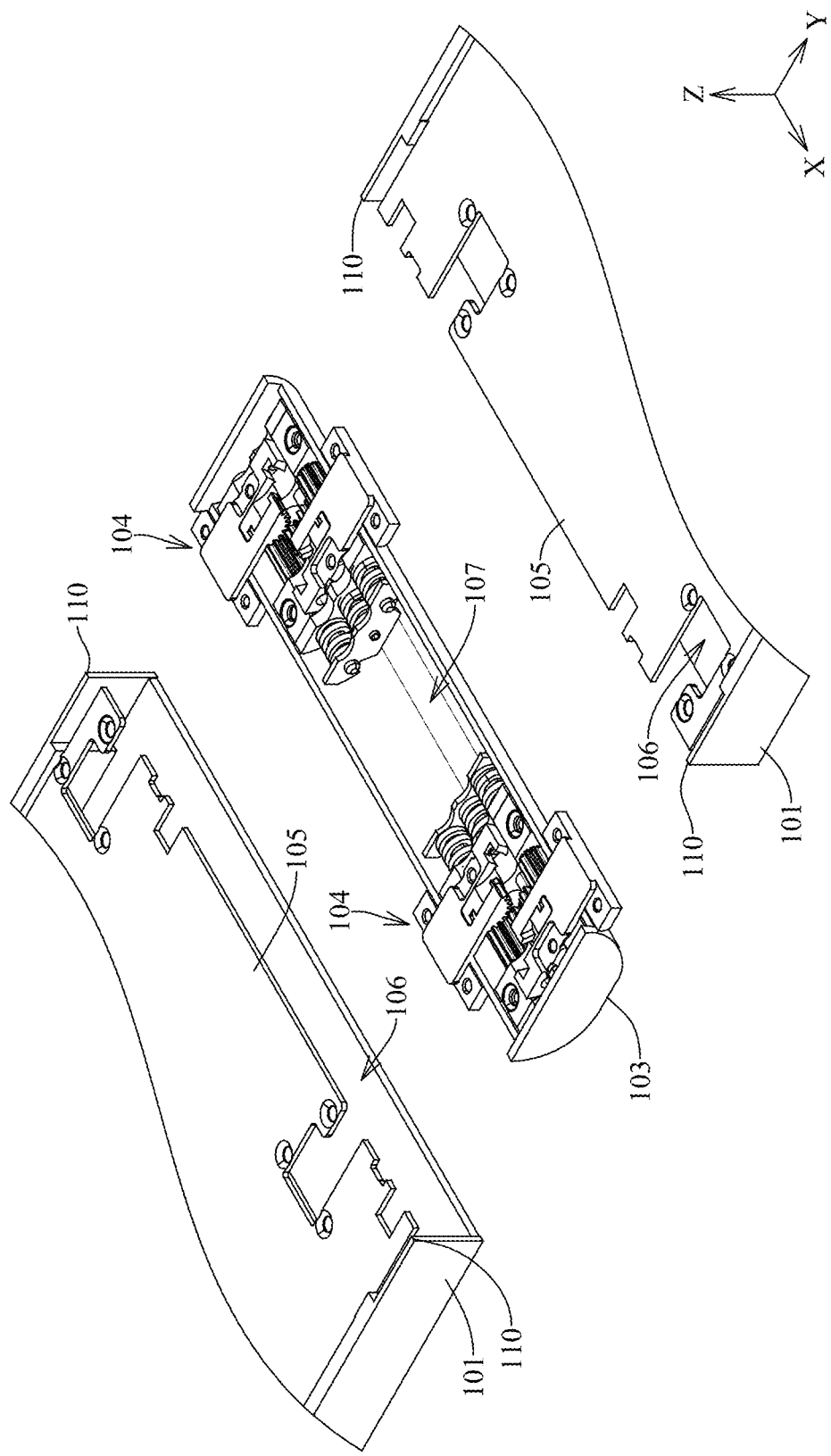
FIG. 2 is a fragmentary exploded perspective view illustrating two of the hinges mounted on a carrier frame between the device parts.

Referring to FIGS. 1 and 2, an embodiment of a hinge 104 according to the disclosure is applicable to a foldable electronic device 100. The foldable electronic device 100 may be a foldable mobile phone, tablet, portable PC, e-book, laptop, or so forth. The foldable electronic device 100 includes two device parts 101, a flexible display screen 102 and a carrier frame 103. Two of the hinges 104 are mounted on the carrier frame 103.

Figure 3:
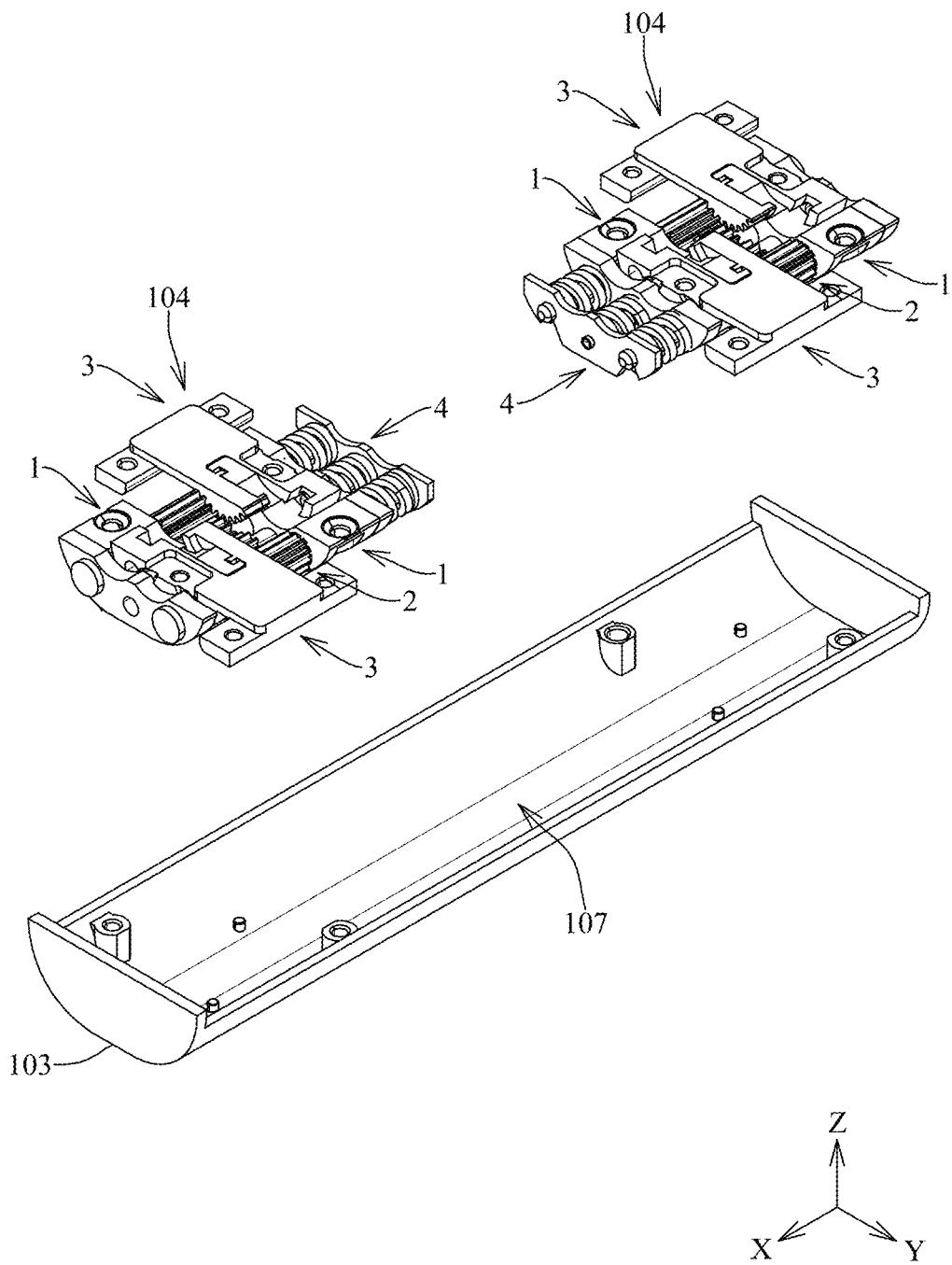
FIG. 3 is an exploded perspective view illustrating the hinges and the carrier frame.
Figure 4:
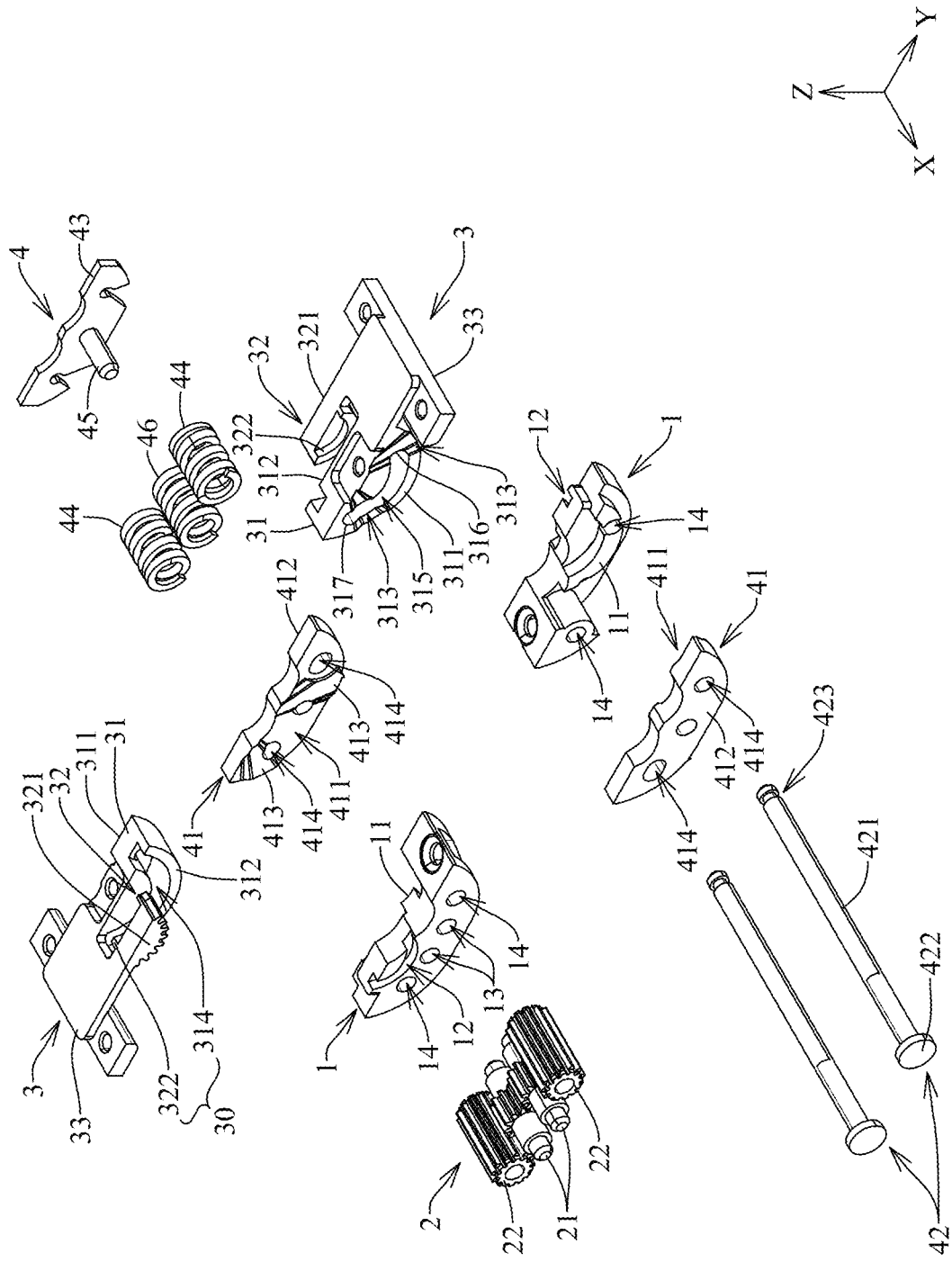
FIG. 4 is an exploded perspective view of the embodiment.
Figure 5:
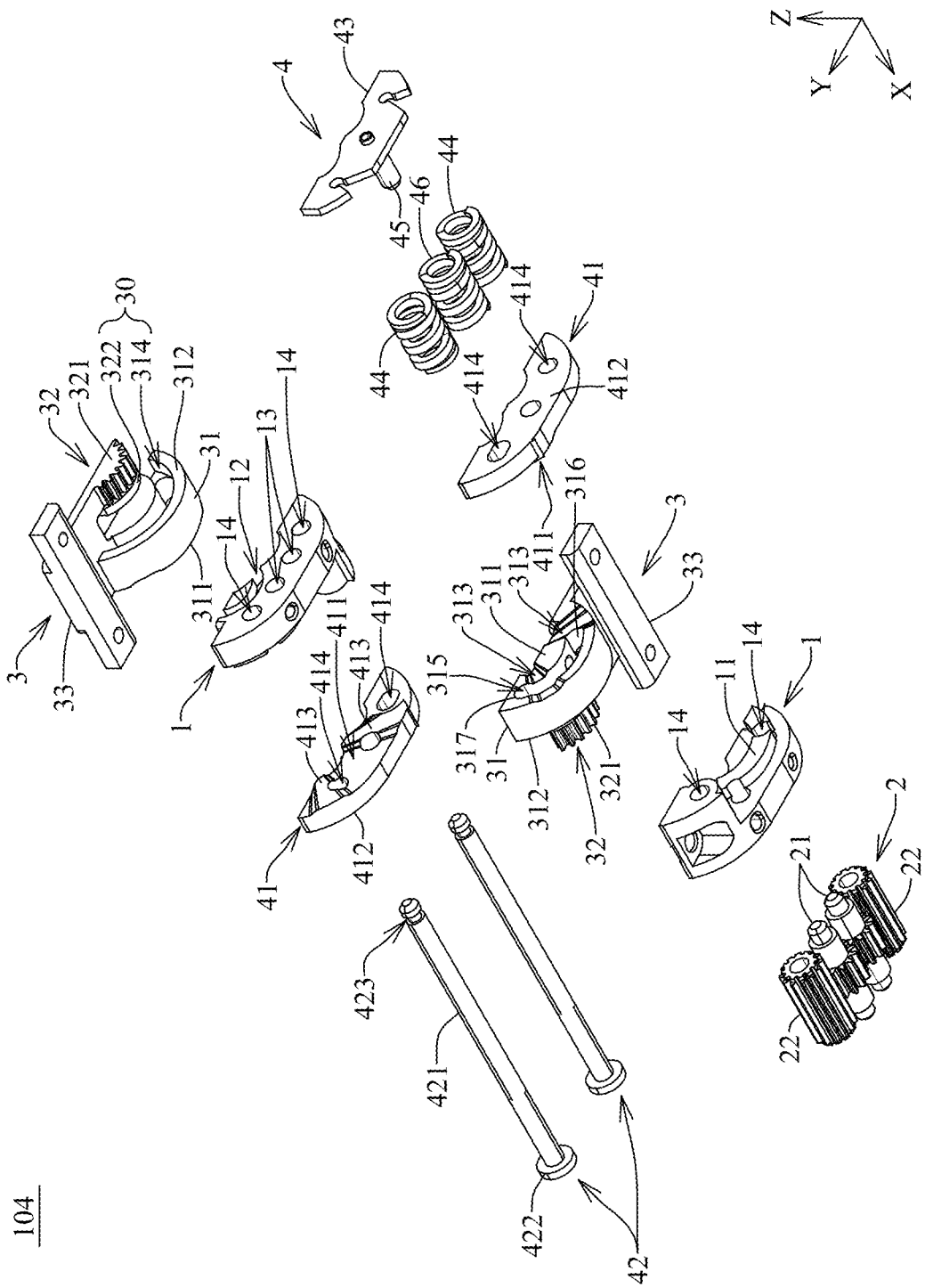
FIG. 5 is an exploded perspective view of the embodiment taken from another angle.

With reference to FIGS. 1, 2 and 3, the device parts 101 are disposed opposite to each other in a left-right direction (Y). Each device part 101 includes a support plate 105. Each device part 101 defines therein an accommodation space 106 with a lateral opening. The flexible display screen 102 is supported on the support plates 105 of the device parts 101. The carrier frame 103 is disposed in the accommodation spaces 106 of the device parts 101, and defines a carrier space 107 opened upwardly. The hinges 104 are disposed in the carrier space 107 and are spaced apart from each other in a front-rear direction (X) that is transverse to the left-right direction (Y). Each hinge 104 is securely connected with the support plates 105 of the device parts 101.

It is noted that the number of the hinges 104 may be varied according to the dimensions of the foldable electronic device 100 and thus may be one or more than two.

With reference to FIGS. 4 to 8, each hinge 104 of the embodiment includes two guide frames 1, a transmitting assembly 2, two rotary brackets 3 and a frictional torque generating assembly 4. The guide frames 1 are disposed opposite to and spaced apart from each other in the front-rear direction (X), and are securely attached to the carrier frame 103 (see FIG. 3) by screws. Each guide frame 1 includes an arcuate first key 11 and an arcuate first keyway 12 which are spaced apart from each other in the front-rear direction (X). The arcuate first key 11 and the arcuate first keyway 12 of one guide frame 1 extend arcuately about a first rotating axis (A), and the arcuate first key 11 and the arcuate first keyway 12 of the other guide frame 1 extend arcuately about a second rotating axis (A). The arcuate first keyway 12 has two opened ends at a top surface of the guide frame 1. The first and second rotating axes (A) extend parallel to the front-rear direction (X) and are spaced apart from each other in the left-right direction (Y). The first and second rotating axes (A) are located above and spaced apart from the guide frames 1 in an up-down direction (Z) that is transverse to both the front-rear direction (X) and the left-right direction (Y) and are flush with each other. Each guide frame 1 has two pivot holes 13 spaced apart from each other in the left-right direction (Y), and two through holes 14 spaced apart from each other in the left-right direction (Y) and disposed laterally of the pivot holes 13.

With reference to FIGS. 4, 5, 6 and 9, the transmitting assembly 2 is interposed between the guide frames 1, and includes two gear shafts 21 and two pinions 22. The gear shafts 21 extend in the front-rear direction (X) and are arranged in the left-right direction (Y) to mesh with each other. Each gear shaft 21 has two ends pivotably connected with the pivot holes 13 of the guide frames 1. The pinions 22 are disposed laterally of and mesh with the gear shafts 21, respectively.

With reference to FIGS. 1, 4, 5, 6 and 10, the rotary brackets 3 are disposed opposite to each other and along the front-rear direction (X). Each rotary bracket 3 is integrally formed to be a single piece by an integrally forming process such as injection molding, die-casting, etc. Each rotary bracket 3 includes a first bracket part 31, a second bracket part 32 and a crosspiece 33. The first bracket part 31 is securely attached to the support plate 105 of the corresponding device part 101 by a screw 108. The first bracket part 31 has a frictional surface 311 and an inward surface 312 opposite to each other in the front-rear direction (X). In this embodiment, the frictional surface 311 is in the form of a cam surface which extends arcuately about the corresponding rotating axis (A) and which has two first interlocking portions 313 that are angularly spaced apart from each other. Each first interlocking portion 313 is in the form of a slot. The inward surface 312 faces the corresponding guide frame 1.

With reference to FIGS. 4, 5, 6, 7 and 11, the first bracket part 31 is formed with an arcuate second keyway 314 which is recessed from the inward surface 312 toward the frictional surface 311, and an arcuate groove 315 which is recessed from the frictional surface 311 toward the inward surface 312 and in communication with the arcuate second keyway 314. The arcuate second keyway 314 extends arcuately about the corresponding rotating axis (A). The arcuate second keyway 314 has an opened end at the top surface of the first bracket part 31. The arcuate second keyway 314 is configured to be matingly and slidably engaged with the arcuate first key 11 of the corresponding guide frame 1. The arcuate groove 315 extends arcuately about the corresponding rotating axis (A) to terminate at opposite first and second stop end faces 316, 317.

With reference to FIGS. 4, 5, 6, 8 and 9, the second bracket part 32 is spaced apart from the first bracket part 31 in the front-rear direction (X) and is disposed inwardly of the first bracket part 31. The second bracket part 32 is disposed inwardly of the corresponding guide frame 1 and above the corresponding gear shaft 21 and the corresponding pinion 22. The second bracket part 32 has an actuating portion 321 and an arcuate second key 322. In this embodiment, the actuating portion 321 is in the form of a segment gear which meshes with the corresponding pinion 22 to actuate rotation of the pinion 22. The arcuate second key 322 projects from the actuating portion 321 and faces the first bracket part 31. The arcuate second key 322 extends arcuately about the corresponding rotating axis (A), and is configured to be matingly and slidably engaged with the arcuate first keyway 12 of the corresponding guide frame 1. The arcuate second key 322 of the second bracket part 32 and the arcuate second keyway 314 corporately define an arcuate pivot portion 30 of each rotary bracket 3 which is pivotably connected with the corresponding guide frame 1.

With reference to FIGS. 1, 6, 10 and 11, the crosspiece 33 is connected between the first bracket part 31 and the second bracket part 32 and is disposed laterally of the corresponding guide frame 1. The crosspiece 33 is disposed adjacent to the first interlocking portion 313 and the first stop end face 316. The crosspiece 33 is securely attached to the support plate 105 of the corresponding device part 101 by two screws 109.

Figure 6:
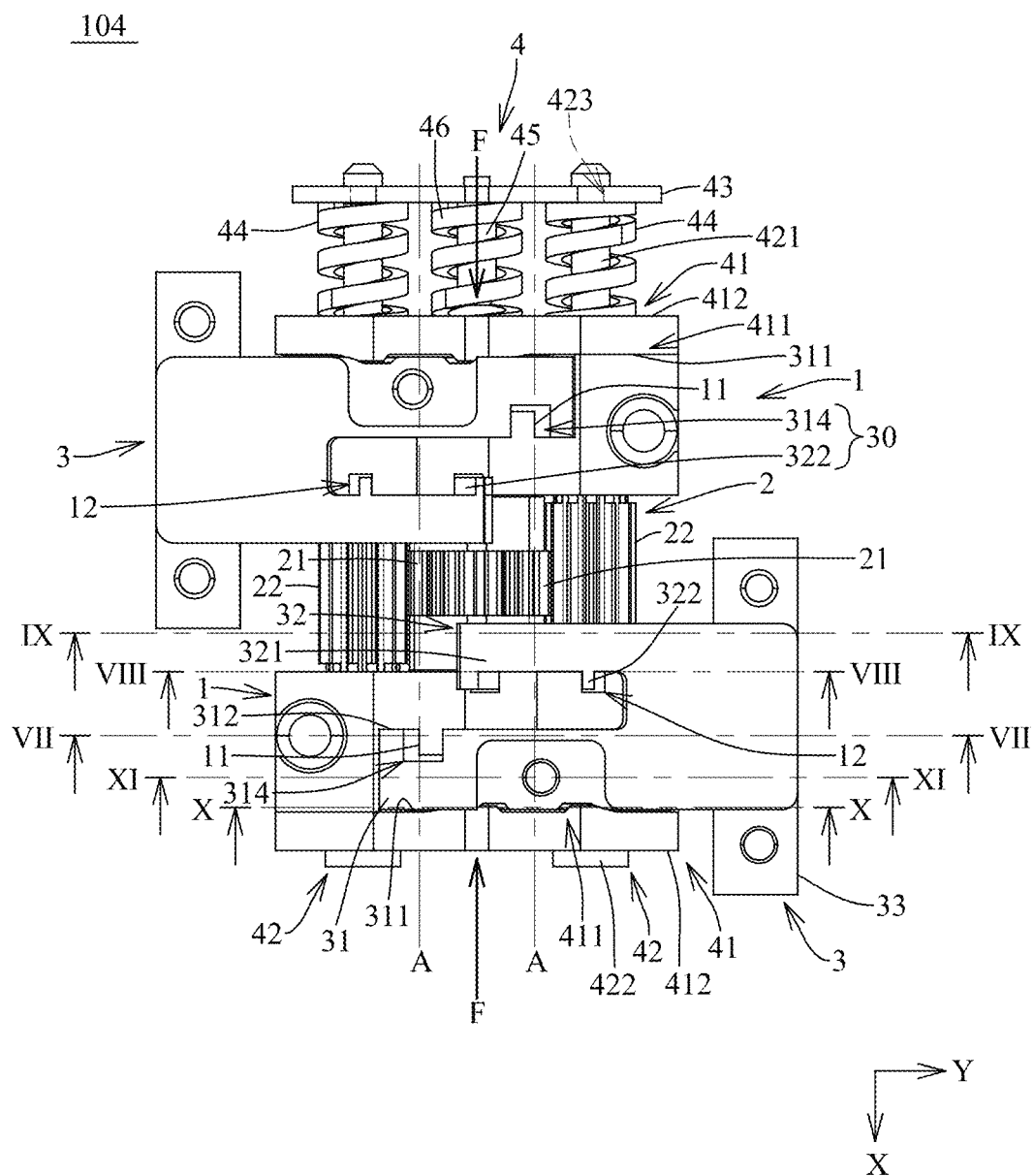
FIG. 6 is a top view of the embodiment.
Figure 7:
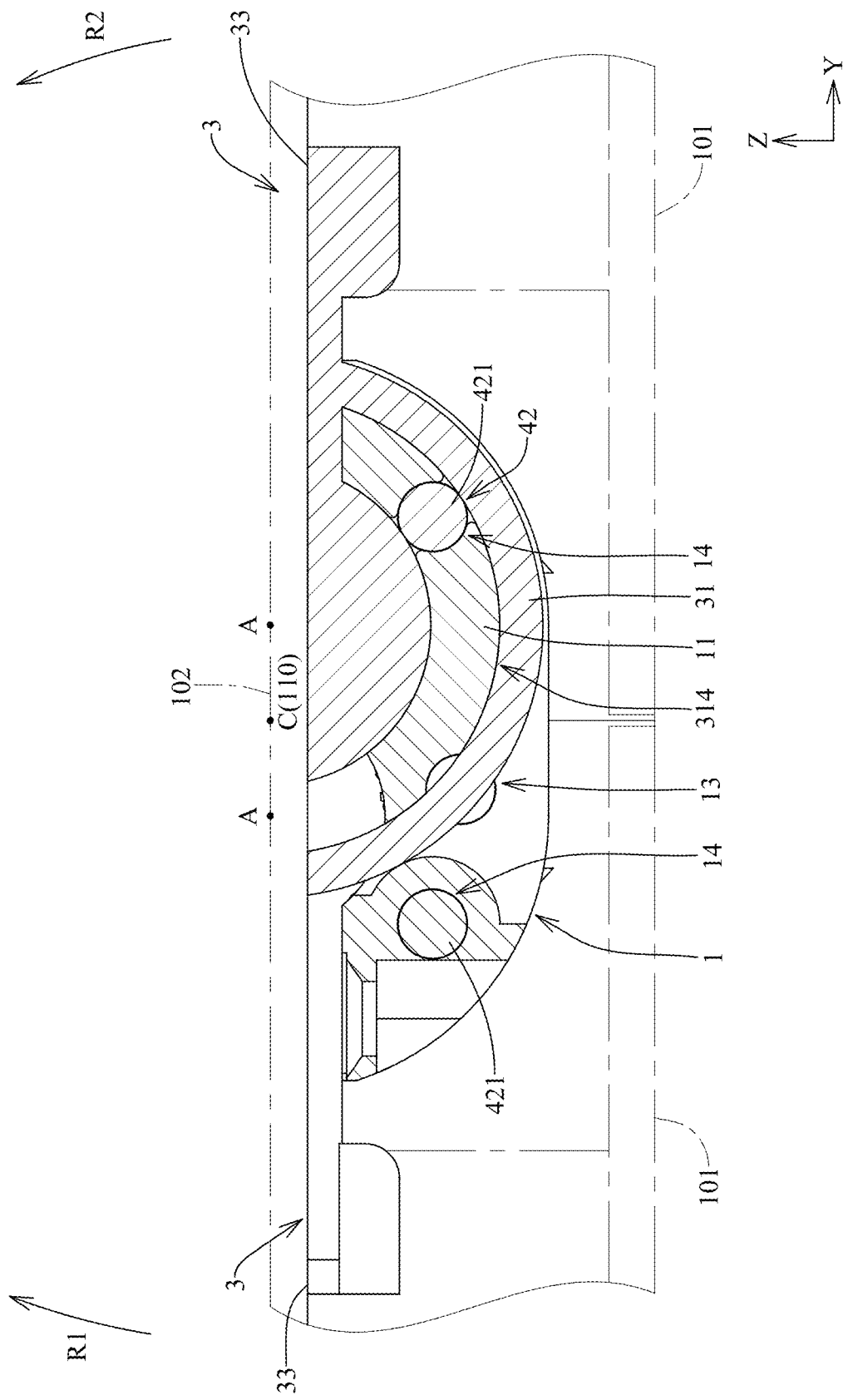
FIG. 7 is a sectional view taken along line VII-VII of FIG. 6, illustrating rotary brackets in a first angular position.
Figure 12:
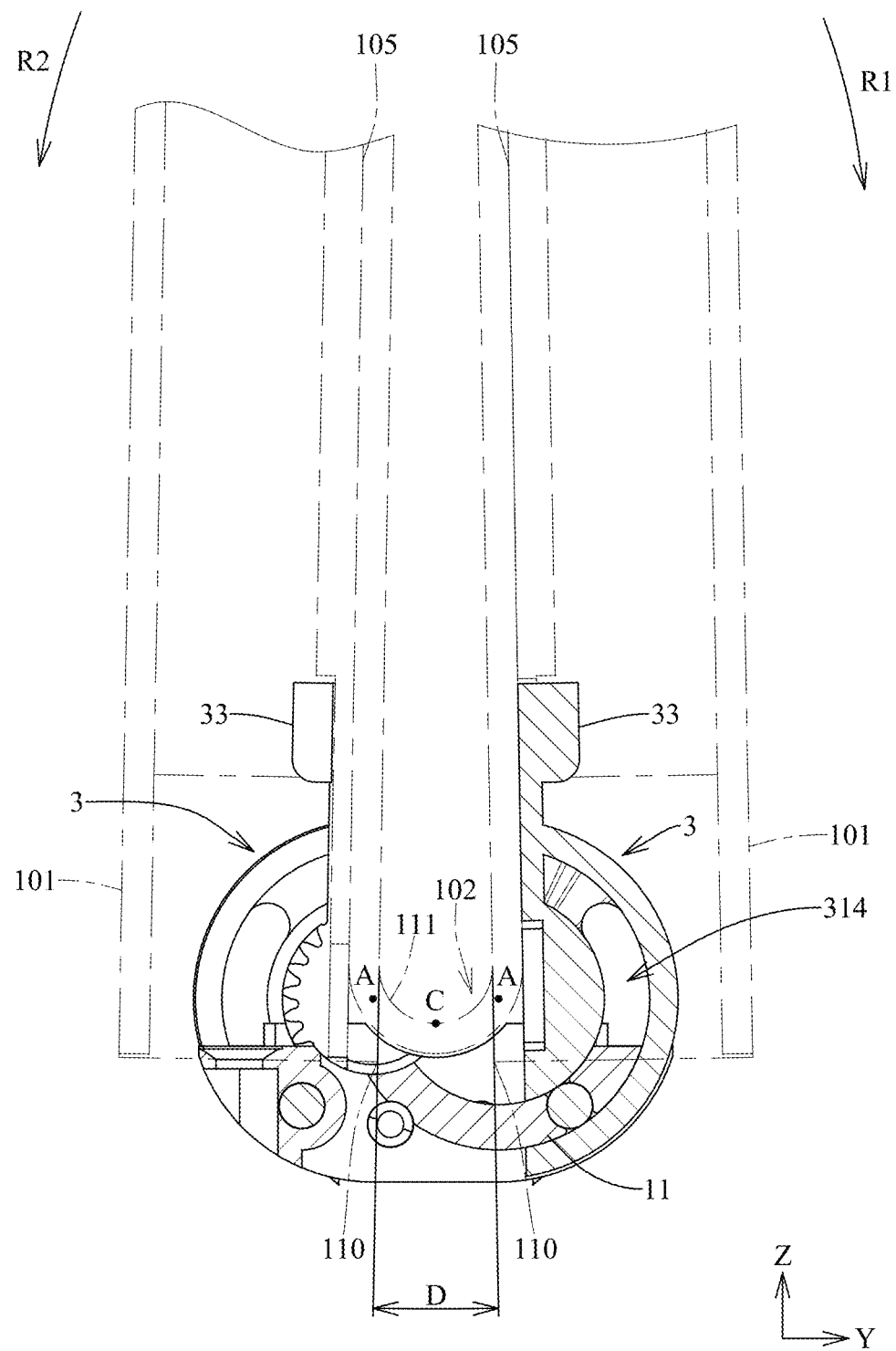
FIG. 12 is a sectional view similar to FIG. 7, illustrating the rotary brackets in a second angular position.

With reference to FIGS. 6 and 7, the rotary brackets 3 are respectively rotatable about the first and second rotating axes (A). Each rotary bracket 3 is rotatable between a first angular position (as shown in FIG. 7) and a second angular position (as shown in FIG. 12). Each rotary bracket 3 is disposed to bring synchronous rotations of the arcuate pivot portion 30, the actuating portion 321 and the frictional surface 311 about the corresponding rotating axis (A) relative to the corresponding guide frame 1, the transmitting assembly 2 and the frictional torque generating assembly 4, and, through the transmitting assembly 2, to make synchronous rotations of the rotary brackets 3 in opposite rotational directions so as to shift the device parts 101 between an unfolded state (as shown in FIG. 7) and a folded state (as shown in FIG. 12).

With reference to FIGS. 4, 5, 6 and 10, the frictional torque generating assembly 4 includes two thrust plates 41, two support shafts 42, a retaining plate 43, two first springs 44, a pin 45 and a second spring 46. The thrust plates 41 are disposed opposite to each other in the front-rear direction (X) and at front and rear sides of the rotary brackets 3, respectively. Each thrust plate 41 includes a thrust major surface 411 and an outer major surface 412 opposite to each other in the front-rear direction (X). The thrust major surface 411 faces the frictional surface 311 of the corresponding rotary bracket 3 and is in frictional contact with it. In this embodiment, the thrust major surface 411 of each thrust plate 41 is in the form of a cam surface which extends arcuately about the corresponding rotating axis (A) and which has two second interlocking portions 413 that are angularly spaced apart from each other and that are engageable with the first interlocking portions 313, respectively. For example, each first interlocking portion 313 is in the form of a concavity, and each second interlocking portion 413 is in the form of a protuberance that occludes the concavity of each interlocking portion 313, and vice versa. Each thrust plate 41 is formed with two through holes 414 extending therethrough in the front-rear direction (X) and aligned with the through holes 14 of the guiding frames 1.

The support shafts 42 extend in the front-rear direction (X) and are spaced apart from each other in the left-right direction (Y). Each support shaft 42 has a shaft body 421 which extends through the corresponding through holes 14 of the guide frames 1, the corresponding pinion 22, the arcuate second keyway 314 and the arcuate groove 315 of the corresponding rotary bracket 3 and the corresponding through holes 414 of the thrust plates 41, and which terminates at a head 422. The outer surface of the shaft body 421 is in frictional contact with the first bracket part 31 of the corresponding rotary bracket 3. An end of the shaft body 421 projects outwardly of the outer major surface 412 of one thrust plate 41 and has an annular groove 423 which is spaced apart from the outer major surface 412. The head 422 is enlarged and abuts against the outer major surface 412 of the other thrust plate 41.

The retaining plate 43 is snap-fitted to the annular grooves 423 of the shaft bodies 421 of the support shafts 42 to be spaced apart from the outer major surface 412 of the thrust plate 41. Each first spring 44 is a compression spring which is sleeved around the shaft body 421 of the corresponding support shaft 42, and abuts against the retaining plate 43 and the outer major surface 412 of the thrust plate 41 so as to bias the thrust plates 41 toward each other. The pin 45 extends from the retaining plate 43 at a middle portion thereof and is disposed between the support shafts 42. For example, the pin 45 is in the form of a rivet connected with the retaining plate 43. The second spring 46 is a compression spring which is sleeved around the pin 45 and which abuts against the outer major surface 412 of the thrust plate 41.

With reference to FIGS. 6, 7, 8 and 9, during assembly, the two ends of each gear shaft 21 are inserted into the corresponding pivot holes 13 of the guide frames 1 and mesh with each other. Subsequently, each rotary bracket 3 is mounted between the guide frames 1 in such a manner that the opened end of the arcuate second keyway 314 is registered with an end of the arcuate first key 11 of the corresponding guide frame 1, an end of the arcuate second key 322 is registered with one opened end of the arcuate first keyway 12 of the corresponding guide frame 1, and the rotary bracket 3 is rotated about the corresponding rotating axis (A) relative to the corresponding guide frame 1 to the first angular position such that the arcuate first key 11 is engaged in the arcuate second keyway 314 and the arcuate second key 322 is engaged in the arcuate first keyway 12. At this stage, the actuating portion 321 meshes with an upper portion of the corresponding pinion 22.

Figure 10:
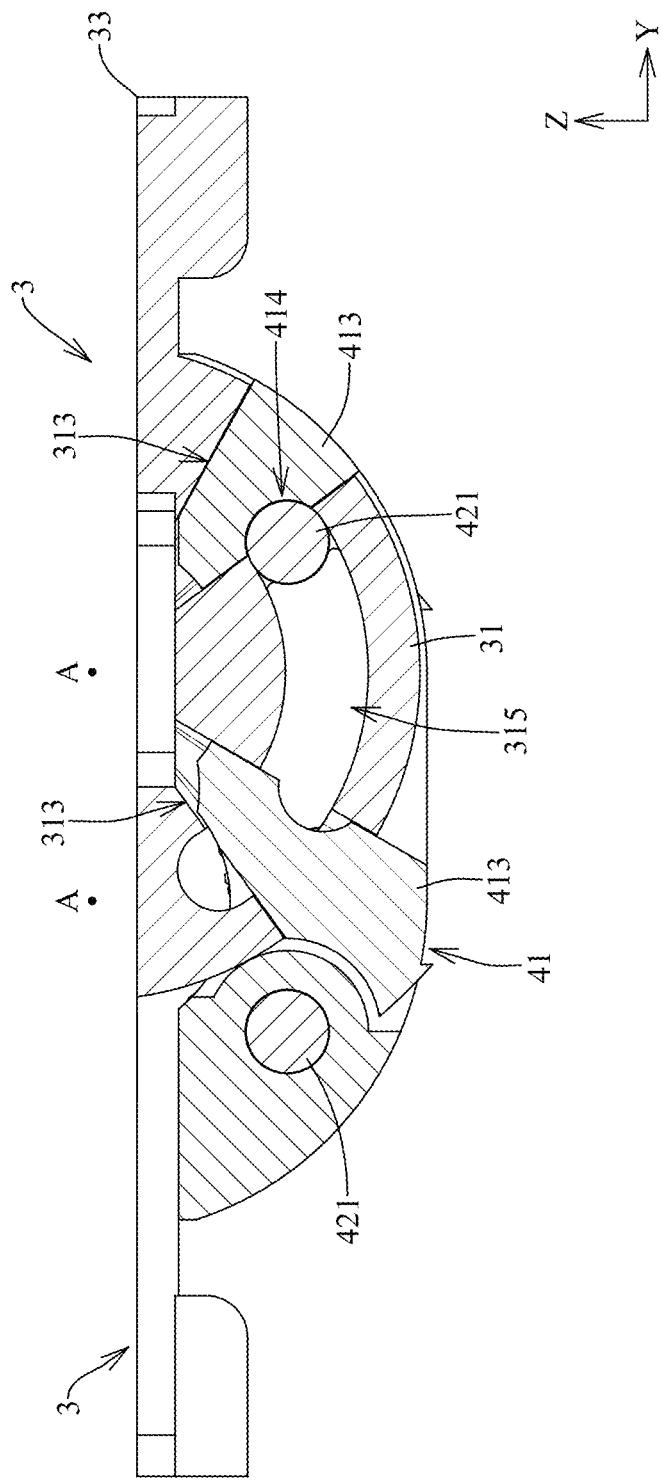
FIG. 10 is a sectional view taken along line X-X of FIG. 6, illustrating the rotary brackets in the first angular position.
Figure 11:
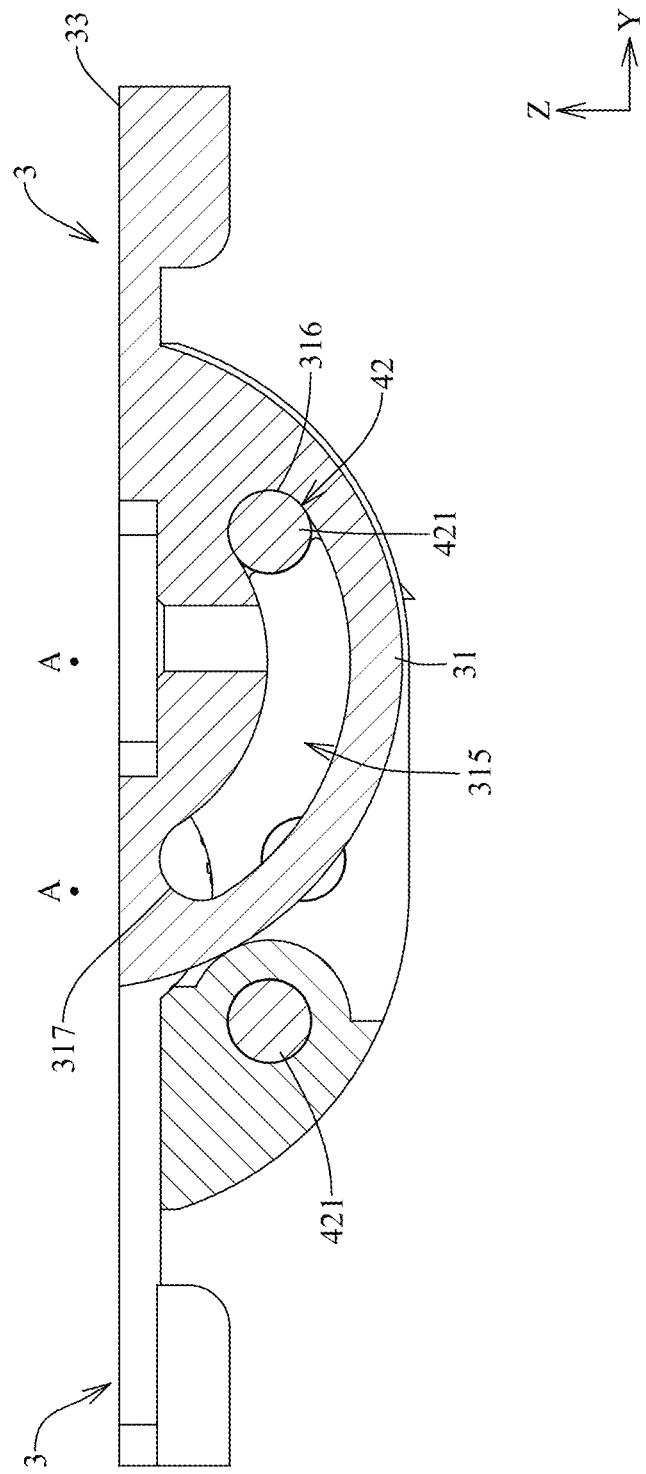
FIG. 11 is a sectional view taken along line XI-XI of FIG. 6, illustrating the rotary brackets in the first angular position.

With reference to FIGS. 6 and 10, the second interlocking portions 413 of each thrust plate 41 are respectively and retainingly engaged with the first interlocking portions 413 of the corresponding rotary bracket 3 so as to bring the thrust major surfaces 411 of the thrust plates 41 in frictional contact with the frictional surfaces 311 of the rotary brackets 3, respectively.

With reference to FIGS. 6 to 11, the shaft body 421 of each support shaft 42 extends through the corresponding through holes 14 of the guide frames 1, the corresponding pinion 22, the arcuate second keyway 314 and the arcuate groove 315 of the corresponding rotary bracket 3 and the corresponding through holes 414 of the thrust plates 41 so as to permit the heads 422 of the support shafts 42 to abut against the outer major surface 412 of the same thrust plate 41, and permit the annular grooves 423 of the support shafts 42 to be spaced apart from the other thrust plate 41. At this stage, each pinion 22 is rotatably sleeved on the shaft body 421 of the corresponding support shaft 42.

Subsequently, each first spring 44 is sleeved around a projecting portion of the shaft body 421 outwardly of the outer major surface 412, and the second spring 45 is sleeved around the pin 45. The retaining plate 43 is aligned with the outer major surface 412 of the thrust plate 41 to compress the first and second springs 44, 46, and is snap-fitted to the annular grooves 423 to keep the first and second springs 44, 46 compressed with biasing pressures.

With reference to FIG. 6, the biasing pressures of the first and second springs 44, 46 urges the outer major surface 412 of the thrust plate 41 with a force that is then transmitted through the retaining plate 43 and the support shafts 42 to the outer major surface 412 of the other thrust plate 41. Therefore, the biasing pressures of first and second springs 44, 46 allow the thrust major surfaces 411 of the thrust plates 41 to apply two opposite thrust forces (F) in the front-rear direction (X) to the frictional surfaces 311 of the rotary brackets 3 so that the thrust plates 41 have tight frictional contact with the frictional surfaces 311.

Since each rotary bracket 3 may be integrally formed to be a single piece, and since the arcuate pivot portion 30, the actuating portion 321 and the frictional surface 311 are integrally formed on each rotary bracket 3, the number of component parts of the hinge 104 can be greatly reduced, thereby facilitating management and assembly of the component parts and reducing the manufacturing, assembly and inspection cost of the hinge 104.

With reference to FIGS. 1, 7, 10 and 11, when the rotary brackets 3 are in the first angular position, the rotary brackets 3 lie flat and the crosspieces 33 are remote from each other in the left-right direction (Y). The device parts 101 are in the unfolded state and the flexible display screen 102 lies flat. Specifically, proximate top ends 110 of each device part 101 are located between the rotating axes (A), and a centerline (C) of the flexible display screen 102 in the front-rear direction (X) is located between the rotating axes (A). With the first interlocking portions 313 of each rotary bracket 3 respectively engaged with the second interlocking portions 413 of the corresponding thrust plate 41, and with the first stop end face 316 of each rotary bracket 3 abutted against the shaft body 421 of the corresponding support shaft 42, each rotary bracket 3 is firmly retained in the first angular position so as to keep the device parts 101 steadily in the unfolded state.

With reference to FIGS. 6 to 11, when it is desired to shift the device parts 101 from the unfolded state to the folded state, the device parts 101 are respectively turned in a first rotational direction (R1) and an opposite second rotational direction (R2). During the turning of the device parts 101, the rotary brackets 3 are respectively rotated about their rotating axes (A) such that the arcuate pivot portion 30, the actuating portion 321, the frictional surface 311 and the arcuate groove 315 are synchronously rotated about the corresponding rotating axis (A) relative to the corresponding guide frame 1, the corresponding pinion 22, the corresponding thrust plate 41 and the corresponding support shaft 42. The arcuate second keyway 314 gradually slides away from the arcuate first key 11 and projects upwardly of the arcuate first key 11, and the arcuate second key 322 gradually slides away from the arcuate first keyway 12 and projects upwardly of the arcuate first keyway 12. The actuating portion 321 actuates rotation of the corresponding pinion 22 to synchronously rotate the gear shafts 21. Each first interlocking portion 313 of the frictional surface 311 is gradually moved away from the corresponding second interlocking portion 413 and presses the corresponding thrust major surface 411 outwardly to move the thrust plate 41 outwardly. The first stop end face 316 is gradually moved away from the corresponding shaft body 421.

Figure 9:
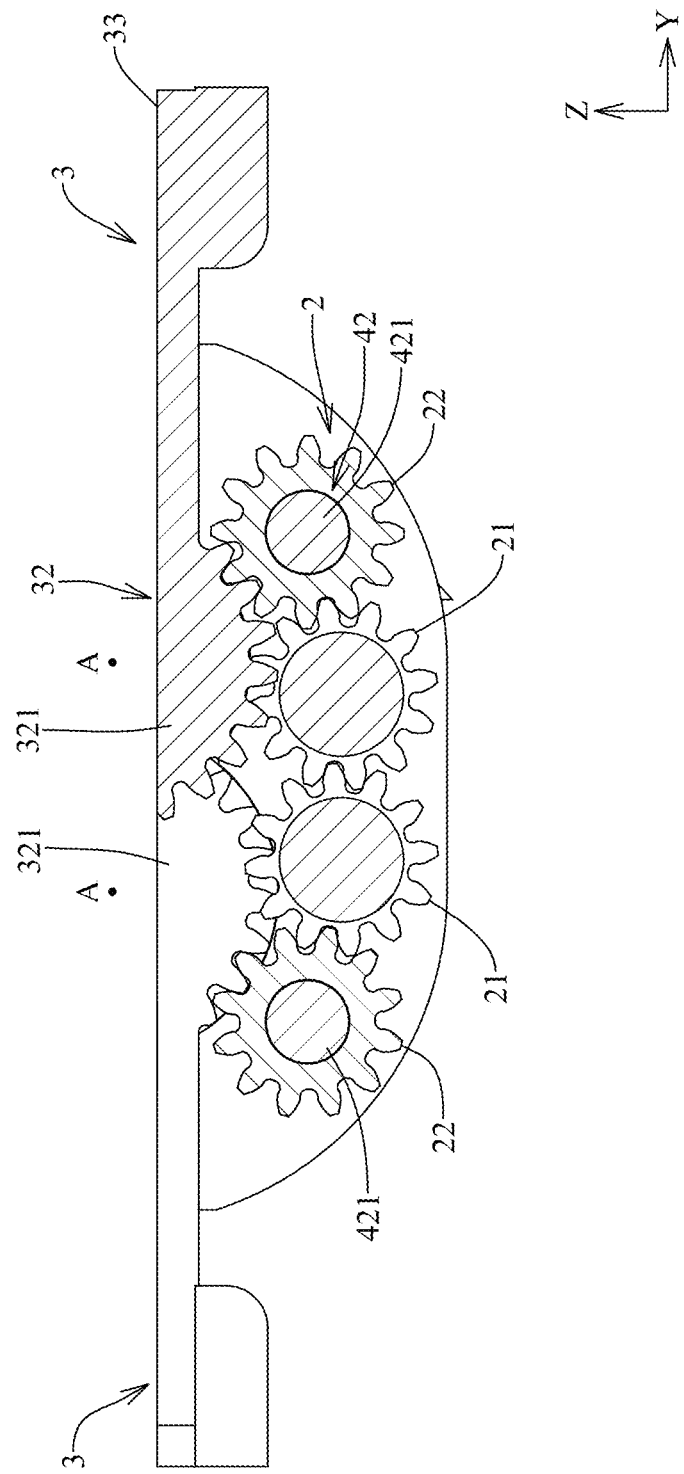
FIG. 9 is a sectional view taken along line IX-IX of FIG. 6, illustrating the rotary brackets in the first angular position.
Figure 13:
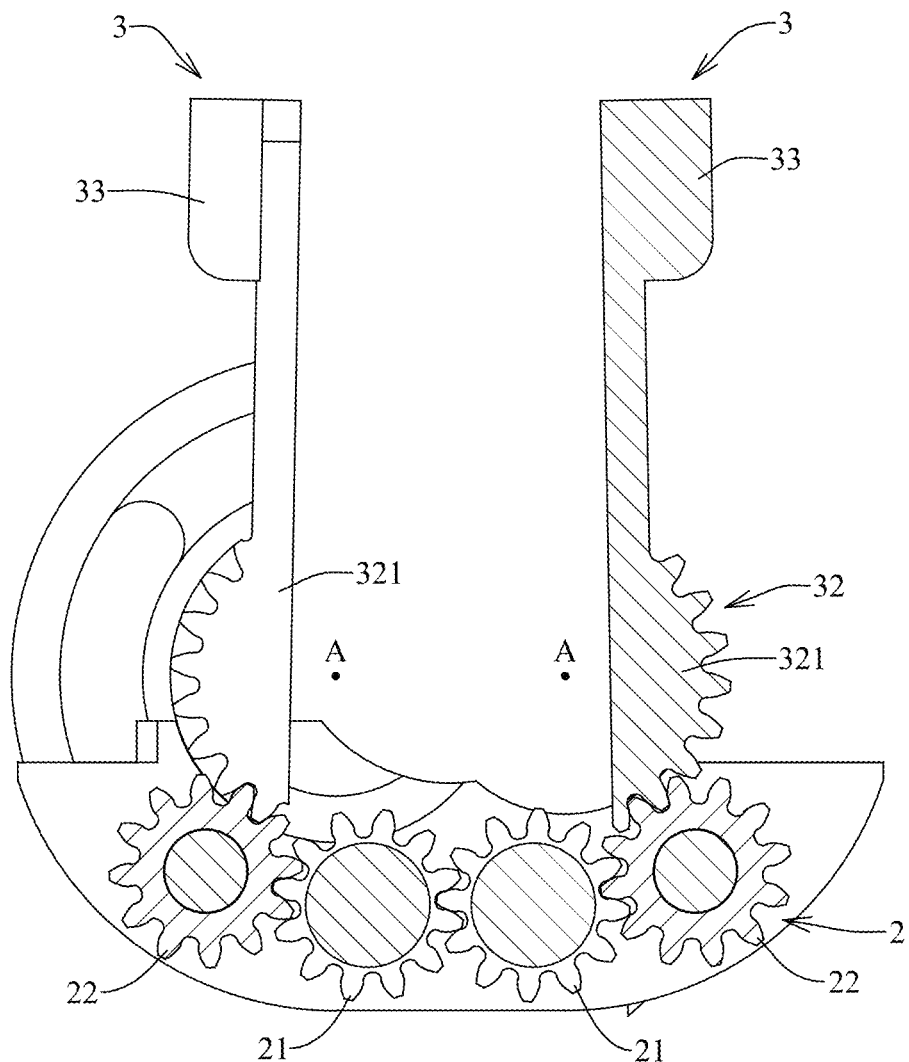
FIG. 13 is a sectional view similar to FIG. 9, illustrating the rotary brackets in the second angular position.
Figure 14:
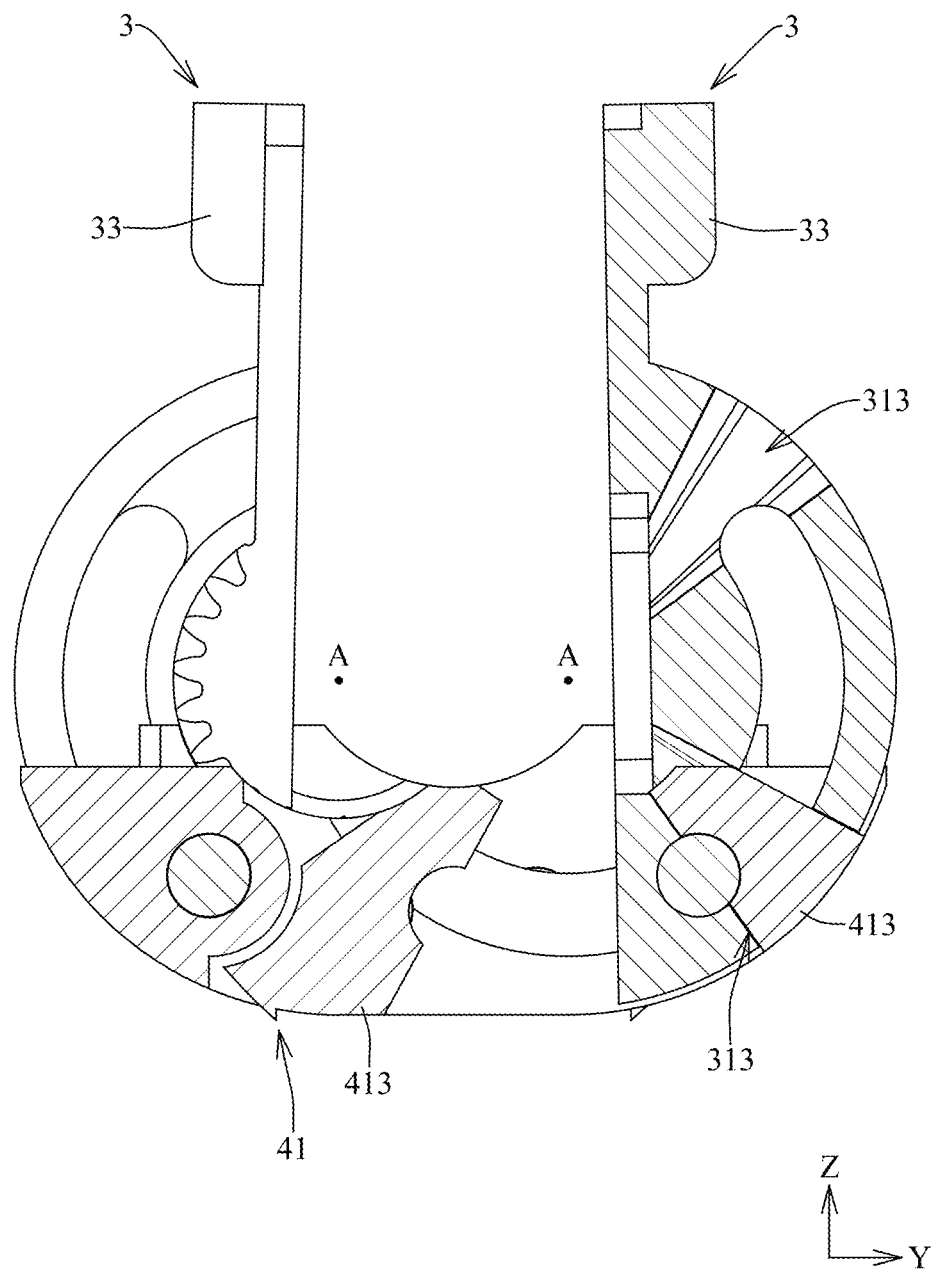
FIG. 14 is a sectional view similar to FIG. 10, illustrating the rotary brackets in the second angular position.
Figure 15:
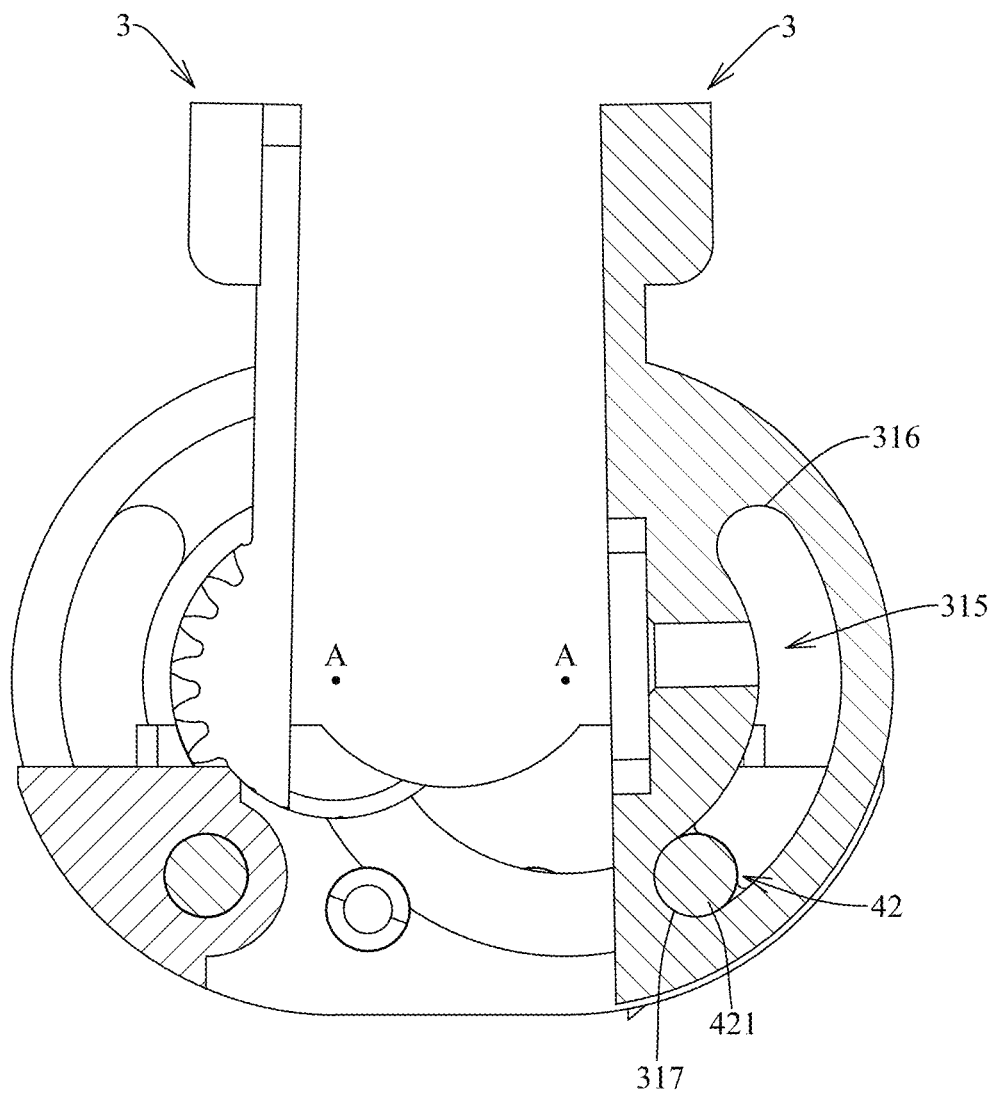
FIG. 15 is a sectional view similar to FIG. 11, illustrating the rotary brackets in the second angular position.

With reference to FIGS. 9, 12 and 13, with the gear shafts 21 meshing with each other, the rotational angles of the pinions 21 are the same such that the rotational angles of the rotary brackets 3 respectively in the first rotational direction (R1) and the second rotational direction (R2) are the same. Moreover, since the pinions 22 respectively mesh with the gear shafts 21 and since the actuating portions 321 respectively mesh with the pinions 22, the actuating portions 321 are gradually moved away from each other during the rotations about the corresponding rotating axes (A).

With reference to FIGS. 7 and 12, since the proximate top ends 110 of the device parts 101 and the centerline (C) of the flexible display screen 102 are located at a middle of the rotating axes (A), during the turning of the device parts 101 through the rotation of the rotary brackets 3 about the rotating axes (A), the proximate top ends 110 of each device part 101 are gradually turned downwardly relative to the corresponding axes (A) so as to move the proximate top ends 110 of the device parts 101 away from each other. Meanwhile, the flexible display screen 102 is bent and the centerline (C) is lowered to form a curve portion 111 extending around the centerline (C).

With reference to FIGS. 6, 12, 13, 14 and 15, when the rotary brackets 3 are rotated to the second angular position, the rotary brackets 3 are erect and the actuating portions 321 are remote from each other while the crosspieces 33 are close to each other. One first interlocking portion 313 of each rotary bracket 3 which is adjacent to the crosspiece 33 is disposed above the corresponding thrust plate 41 and the other first interlocking portion 313 is aligned with the corresponding second interlocking portion 413 of the thrust plate 41. With the biasing pressure of the first and second springs 44, 46, each thrust plate 41 is pressed inwardly toward the corresponding rotary bracket 3 such that the second interlocking portion 413 is retainingly engaged with the corresponding first interlocking portion 313 to create a feeling of resistance to the user, which indicates that the rotary brackets 3 have reached the second angular position. Moreover, the second stop end face 317 of each rotary bracket 3 is abutted against the shaft body 421 of the corresponding support shaft 42 to prevent further rotation of the rotary bracket 3. With the second interlocking portion 413 retainingly engaged with the first interlocking portion 313, and the shaft body 421 stopping the second stop end face 317, each rotary bracket 3 is firmly retained in the second angular position.

With reference to FIGS. 12 and 13, when the rotary brackets 3 are retained in the second angular position, the device parts 101 are positioned in the folded state, where the support plates 105 are close to each other and face each other. Through the rotation of the arcuate pivot portions 30 of the rotary brackets 3 about the corresponding rotating axes (A) (see FIG. 6), when the rotary brackets 3 are retained to the second angular position, the actuating portions 321 are remote from each other and the proximate top ends 110 of the device parts 101 are distant from each other in the left-right direction (Y) by a distance (D), which provides a space for accommodating the curve portion 111 of the flexible display screen 102 which prevents damage to the flexible display screen.

With reference to FIGS. 12 to 15, when it is desired to shift the device parts 101 from the folded state to the unfolded state, the device parts 101 are respectively turned in the second rotational direction (R2) and the first rotational direction (R1) to rotate the rotary brackets 3 about the rotating axes (A), respectively. During the rotation of each rotary bracket 3, the arcuate second keyway 314 gradually slides on the arcuate first key 11, and the arcuate second key 322 gradually slides in the arcuate first keyway 12. The actuating portions 321 are moved close to each other and the crosspieces 33 are moved distal to each other. Each first interlocking portion 313 of the frictional surface 311 is gradually moved away from the corresponding second interlocking portion 413 and presses the corresponding thrust major surface 411 outwardly to move the thrust plate 41 outwardly (see FIG. 6). The second stop end face 317 is gradually moved away from the corresponding shaft body 421.

Moreover, during the turning of the device parts 101 through the rotation of the rotary brackets 3 about the rotating axes (A), the proximate top ends 110 of each device part 101 are gradually turned upwardly and toward the middle between the rotating axes (A) so as to be close to the proximate top ends 110 of the other device part 101, and the curve portion 111 of the flexible display screen 102 is moved upwardly to gradually lie flat.

With reference to FIGS. 6, 7, 10 and 11, when the rotary brackets 3 are rotated to the first angular position to lie flat, the first interlocking portions 313 of each rotary bracket 3 are respectively aligned with the second interlocking portions 413 of the corresponding thrust plate 41. With the biasing pressure of the first and second springs 44, 46, each thrust plate 41 is pressed inwardly toward the corresponding rotary bracket 3 such that the second interlocking portions 413 are respectively and retainingly engaged with the first interlocking portions 313 to create a feeling of resistance to the user, which indicates that the rotary brackets 3 has reached the first angular position. Moreover, the first stop end face 316 of each rotary bracket 3 is abutted against the shaft body 421 of the corresponding support shaft 42 to prevent further rotation of the rotary bracket 3. Thus, each rotary bracket 3 is returned to and retained in the first angular position.

Figure 8:
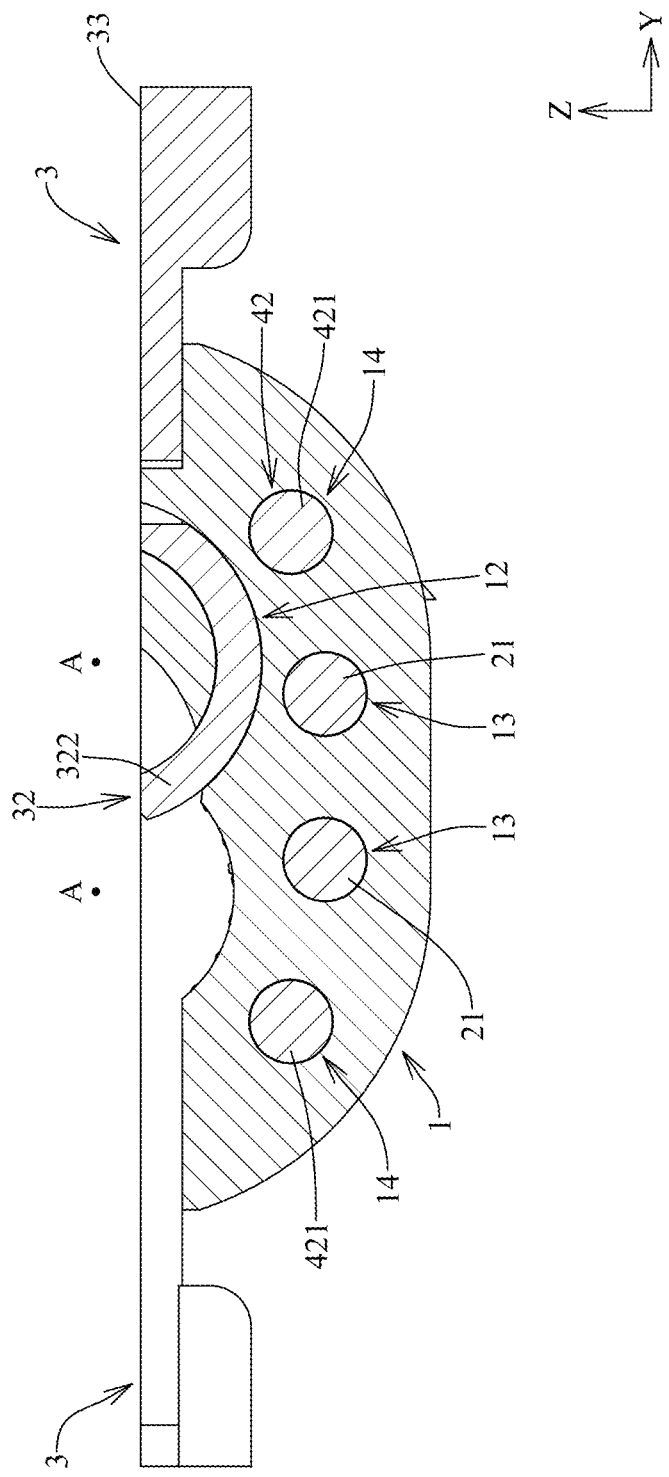
FIG. 8 is a sectional view taken along line VIII-VIII of FIG. 6, illustrating the rotary brackets in the first angular position.

With reference to FIGS. 7, 8 and 9, through the sliding engagement of the arcuate second keyway 314 of the first bracket part 31 and the arcuate second key 322 of the second bracket part 32 of each rotary bracket 3 with the arcuate first key 11 and the arcuate first keyway 12 of the corresponding guide frame 1, the rotary brackets 3 are smoothly slidable and steadily rotatable relative to the guide frames 1, and misalignment between the actuating portions 321 from the pinions 22 may be avoided.

With reference to FIGS. 6, 10, 11 and 12, during the rotation of each rotary bracket 3 between the first and second angular positions, with the frictional torque generating as a result of frictional contact of the frictional surface 311 with the thrust major surface 411 of the corresponding thrust plate 41, each rotary bracket 3 can be retained at any desired angular position. Moreover, with the first bracket part 31 in frictional contact with the outer surface of the corresponding shaft body 421 during the rotation of the rotary bracket 3, the rotary bracket 3 can be retained more steadily in the desired angular position.

The guide frames 1, the transmitting assembly 2 and the rotary brackets 3 are connected through the thrust plates 41, the support shafts 42, the retaining plate 43 and the first springs 44. The frictional torque generating assembly 4 has a fewer number of component parts, thereby reducing the manufacturing, assembling and inspection cost of the hinge 104. Moreover, with the biasing pressures of the first and second springs 44, 46, the thrust major surfaces 411 of the thrust plates 41 are able to apply two opposite thrust forces (F) to the frictional surfaces 311 of the rotary brackets 3 to retain the rotary brackets 3 with frictional torque. Furthermore, through the engagement of the support shafts 42 with the arcuate grooves 315 of the rotary brackets 3, excess rotation of the rotary brackets 3 relative to the guide frames 1 can be prevented. With the design of the pin 45 and the second spring 46, a further thrust force may be applied.

Alternatively, in another modified embodiment, the frictional surface 311 of each rotary bracket 3 may be in the form of a flat surface to dispense with the first interlocking portions 313, and the thrust major surface 411 of each thrust plate 41 may be in the form of a flat surface to dispense with the second interlocking portions 413. Alternatively, the pin 45 and the second spring 46 of the frictional torque generating assembly 4 may be dispensed with.

As illustrated, with the rotary brackets 3 operatively connected with the guide frames 1 through the transmitting assembly 2 to perform the synchronous rotations of the device parts 101, with the rotary brackets 3 operatively connected with the frictional torque generating assembly 4 to generate a frictional torque, and with each rotary bracket 3 having the arcuate pivot portion 30, the actuating portion 321 and the frictional surface 311 integrally formed thereon as a single piece, the number of component parts of the hinge 104 is greatly reduced to facilitate management and assembling of the component parts and reduce the manufacturing, assembling and inspection cost of the hinge 104. Thus, the hinge 104 is made compact. In the embodiment, each rotary bracket 3 has the first and second bracket parts 31, 32 such that the corresponding guide frame 1 is pivotably connected with and sandwiched between the first and second bracket parts 31, 32, which reduces the number of the guide frames 1 as compared with the prior art. Specifically, in the embodiment, each rotary bracket 3 is integrally formed to be a single piece with the arcuate pivot portion 30, the actuating portion 321 and the frictional surface 311 such that the rotary bracket 3 can serve as both the rotary bracket and the cam frame in the prior art.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hinge comprising:
   two guide frames disposed opposite to and spaced apart from each other in a front-rear direction;
   a transmitting assembly interposed between said guide frames;
   a frictional torque generating assembly including two thrust plates which are disposed opposite to each other in the front-rear direction; and
   two rotary brackets disposed opposite to each other and along the front-rear direction, each of said rotary brackets including an arcuate pivot portion which is pivotably connected with a respective one of said guide frames, an actuating portion which is coupled with said transmitting assembly to actuate said transmitting assembly with pivoting rotation of said arcuate pivot portion relative to said respective guide frame, and a frictional surface which is in frictional contact with a respective one of said thrust plates, wherein each of said rotary brackets is disposed to bring synchronous rotations of said arcuate pivot portion, said actuating portion and said frictional surface relative to said respective guide frame, said transmitting assembly and said respective thrust plate and, through said transmitting assembly, to make synchronous rotations of said rotary brackets in opposite rotational directions.

2. The hinge of claim 1, wherein each of said rotary brackets is integrally formed to be a single piece.

3. The hinge of claim 1, wherein each of said rotary brackets includes a first bracket part, a second bracket part and a crosspiece, said first bracket part being interposed between said respective guide frame and said respective thrust plate and having said frictional surface, said second bracket part being spaced apart from said first bracket part in the front-rear direction and having said actuating portion, said crosspiece being connected between said first bracket part and said second bracket part, said arcuate pivot portion being formed on said first and second bracket parts.

4. The hinge of claim 3, wherein each of said guide frames includes an arcuate first key and an arcuate first keyway which are spaced apart from each other in the front-rear direction, said arcuate pivot portion having an arcuate second keyway which is formed on said first bracket part to be slidably engaged with said arcuate first key, and an arcuate second key which is formed on said second bracket part to be slidably engaged with said arcuate first keyway.

5. The hinge of claim 1, wherein said transmitting assembly includes two gear shafts which extend in the front-rear direction to be rotatably connected between said guide frames and which mesh with each other, and two pinions which are disposed laterally of and mesh with said gear shafts, respectively, said actuating portion of each of said rotary brackets being in form of a segment gear which meshes with a respective one of said pinions.

6. The hinge of claim 1, wherein said thrust plates respectively have thrust major surfaces which face each other in the front-rear direction to be in frictional contact with said frictional surfaces of said rotary brackets, respectively, with two biasing pressures in opposite directions.

7. The hinge of claim 6, wherein said frictional surface is in form of a cam surface which has two first interlocking portions that are angularly spaced apart from each other, said thrust major surface of each of said thrust plates being in form of a cam surface which has two second interlocking portions that are angularly spaced apart from each other and that are engageable with said first interlocking portions, respectively, each of said rotary brackets being rotatable between a first angular position, where said first interlocking portions are respectively and retainingly engaged with said second interlocking portions, and a second angular position, where one of said first interlocking portions is disposed above said respective thrust plate and the other one of said first interlocking portions is retainingly engaged with said respective second interlocking portion.

8. The hinge of claim 7, wherein each of said first interlocking portions is in form of one of a concavity and a protuberance, and each of said second interlocking portions is in form of the other one of said concavity and said protuberance.

9. The hinge of claim 7, wherein said rotary brackets are respectively rotatable about rotating axes which are parallel to the front-rear direction and spaced apart from each other in a left-right direction that is transverse to the front-rear direction, said rotating axes being located above and spaced apart from said guide frames in an up-down direction that is transverse to both the front-rear direction and the left-right direction and being flush with each other, said arcuate pivot portion, said actuating portion and said frictional surface of each of said rotary brackets being synchronously rotated about a respective one of said rotating axes.

10. The hinge of claim 6, wherein each of said thrust plates has an outer major surface opposite to said respective thrust major surface, said frictional torque generating assembly further including two support shafts, a retaining plate and two first springs, said support shafts extending in the front-rear direction and being spaced apart from each other in a left-right direction that is transverse to the front-rear direction, each of said support shafts having a shaft body which extends through said guide frames, said transmitting assembly, said respective rotary bracket and said thrust plates, and which terminates at a head that abuts against said outer major surface of one of said thrust plates, said retaining plate being retained on ends of said shaft bodies of said support shafts remote from said heads, each of said first springs being sleeved around said shaft body of a respective one of said support shafts and abutting against said retaining plate and said outer major surface of the other one of said thrust plates so as to bias said thrust plates toward each other.

11. The hinge of claim 10, wherein said frictional torque generating assembly further includes a pin which extends from said retaining plate and which is disposed between said support shafts, and a second spring which is sleeved around said pin and which abuts against said outer major surface of said other thrust plate.

12. The hinge of claim 10, wherein each of said rotary brackets is formed with an arcuate groove which extends arcuately to terminate at opposite first and second stop end faces, said shaft body of each of said support shafts extending through and slidably and frictionally engaged with said arcuate groove of a respective one of said rotary brackets such that each of said rotary brackets is rotatable between a first angular position, where said first stop end face is abutted against said shaft body, and a second angular position, where said second stop end face is abutted against said shaft body.

13. The hinge of claim 1, wherein said rotary brackets are respectively rotatable about rotating axes which are parallel to the front-rear direction and spaced apart from each other in a left-right direction that is transverse to the front-rear direction, said rotating axes being located above and spaced apart from said guide frames in an up-down direction that is transverse to both the front-rear direction and the left-right direction and being flush with each other, said arcuate pivot portion, said actuating portion and said frictional surface of each of said rotary brackets being synchronously rotated about a respective one of said rotating axes.

14. The hinge of claim 1, wherein each of said rotary brackets is formed with an arcuate groove which extends arcuately to terminate at opposite first and second stop end faces, said frictional torque generating assembly further including two support shafts which are spaced apart from each other in a left-right direction that is transverse to the front-rear direction, each of said support shafts extending in the front-rear direction through said guide frames, said transmitting assembly, said arcuate groove of a respective one of said rotary brackets and said thrust plates, each of said support shafts being slidably engaged with said arcuate groove such that each of said rotary brackets is rotatable between a first angular position, where said first stop end face is abutted against a respective one of said support shafts, and a second angular position, where said second stop end face is abutted against said respective support shaft.

15. The hinge of claim 14, wherein said transmitting assembly includes two gear shafts which extend in the front-rear direction to be rotatably connected between said guide frames and which mesh with each other, and two pinions which are disposed laterally of and mesh with said gear shafts, respectively, and which are respectively and rotatably sleeved on said support shafts, said actuating portion of each of said rotary brackets being in form of a segment gear which meshes with a respective one of said pinions.

* * * * *